(12) United States Patent
Glovin et al.

(10) Patent No.: US 7,480,657 B1
(45) Date of Patent: Jan. 20, 2009

(54) CACHING INFORMATION FOR MULTIPLE SERVICE APPLICATIONS

(75) Inventors: Steven R. Glovin, Chelmsford, MA (US); Stephen R. Quatrano, Lexington, MA (US); Michael P. Lepore, Marlborough, MA (US); Cun Yong Tan, Tewksbury, MA (US); Ryan J. Schuft, Tyngsborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 770 days.

(21) Appl. No.: 10/337,452

(22) Filed: Jan. 6, 2003

(51) Int. Cl.
*G06F 7/00* (2006.01)
*G06F 15/16* (2006.01)

(52) U.S. Cl. ............ 707/10; 707/1; 707/4; 707/5; 707/100; 707/200; 709/201; 709/202; 709/217; 709/218; 709/219; 711/104; 711/114

(58) Field of Classification Search .......... 707/6, 707/10, 200, 1–5, 100; 711/148, 100–104, 711/114, 118, 141, 152; 709/213–214, 203, 709/200, 201–202, 217–219, 223–230, 328; 705/50
See application file for complete search history.

(56) References Cited

U.S. PATENT DOCUMENTS

| | | | | |
|---|---|---|---|---|
| 4,905,141 A | | 2/1990 | Brenza | 364/200 |
| 4,914,585 A | * | 4/1990 | Packard et al. | 716/18 |
| 5,410,697 A | * | 4/1995 | Baird et al. | 711/152 |
| 5,457,780 A | * | 10/1995 | Shaw et al. | 345/502 |
| 5,475,819 A | * | 12/1995 | Miller et al. | 709/203 |
| 5,517,662 A | * | 5/1996 | Coleman et al. | 709/201 |
| 5,604,753 A | | 2/1997 | Bauer et al. | 371/40.1 |
| 5,611,038 A | * | 3/1997 | Shaw et al. | 715/202 |
| 5,768,623 A | * | 6/1998 | Judd et al. | 710/37 |
| 5,933,599 A | * | 8/1999 | Nolan | 715/734 |
| 5,974,409 A | * | 10/1999 | Sanu et al. | 707/3 |
| 5,987,621 A | * | 11/1999 | Duso et al. | 714/4 |
| 6,098,116 A | * | 8/2000 | Nixon et al. | 710/8 |
| 6,173,374 B1 | * | 1/2001 | Heil et al. | 711/148 |
| 6,327,587 B1 | * | 12/2001 | Forster | 707/2 |
| 6,343,287 B1 | * | 1/2002 | Kumar et al. | 707/4 |

(Continued)

FOREIGN PATENT DOCUMENTS

WO    WO 97/45798    * 12/1997

OTHER PUBLICATIONS

"Global file store: a massive storage system on the Internet concept and design"—Han Hua, Guo Chaoyang, Dai Yafei and Li Xiaoming—Computer Networks and Mobile Computing—Oct. 16-19, 2001 (pp. 165-175).*

(Continued)

*Primary Examiner*—Jean Bolte Fleurantin
*Assistant Examiner*—Anh Ly
(74) *Attorney, Agent, or Firm*—Baker Botts L.L.P.

(57) ABSTRACT

A method for storing information includes receiving a command for a selected one of a plurality of services, and forwarding the command to a data source corresponding to the selected service. The method also includes, receiving data from the data source, and storing the data in a selected namespace in a cache corresponding to the selected service. The method further includes invalidating the data in the namespace according to invalidation criteria provided by the selected service.

17 Claims, 5 Drawing Sheets

U.S. PATENT DOCUMENTS

| | | | |
|---|---|---|---|
| 6,351,748 B1 * | 2/2002 | Deen et al. ..................... 707/10 |
| 6,385,606 B2 * | 5/2002 | Inohara et al. ................. 707/4 |
| 6,389,427 B1 | 5/2002 | Faulkner ................. 707/104.1 |
| 6,408,298 B1 * | 6/2002 | Van et al. ...................... 707/10 |
| 6,446,253 B1 * | 9/2002 | Mellmer ..................... 717/100 |
| 6,510,450 B1 * | 1/2003 | Ricart et al. ................ 709/203 |
| 6,584,548 B1 * | 6/2003 | Bourne et al. ............... 711/134 |
| 6,601,065 B1 * | 7/2003 | Nelson et al. .................. 707/4 |
| 6,611,844 B1 * | 8/2003 | Saulpaugh et al. ...... 707/103 R |
| 6,662,198 B2 * | 12/2003 | Satyanarayanan et al. ... 707/204 |
| 6,675,264 B2 * | 1/2004 | Chen et al. .................. 711/141 |
| 6,675,353 B1 * | 1/2004 | Friedman .................... 709/226 |
| 6,684,230 B1 * | 1/2004 | Momoh et al. .............. 707/205 |
| 6,757,708 B1 * | 6/2004 | Craig et al. .................. 707/10 |
| 6,889,249 B2 * | 5/2005 | Miloushev et al. .......... 709/213 |
| 6,895,586 B1 * | 5/2005 | Brasher et al. .............. 719/313 |
| 6,912,522 B2 * | 6/2005 | Edgar ............................ 707/2 |
| 6,920,461 B2 * | 7/2005 | Hejlsberg et al. ....... 707/103 R |
| 6,950,866 B1 * | 9/2005 | Lowry et al. ................ 709/223 |
| 6,985,983 B2 * | 1/2006 | Pellegrino et al. .......... 710/200 |
| 7,013,303 B2 * | 3/2006 | Faybishenko et al. ......... 707/10 |
| 7,017,162 B2 * | 3/2006 | Smith et al. ................. 719/328 |
| 7,111,084 B2 * | 9/2006 | Tan et al. ...................... 710/15 |
| 7,165,239 B2 * | 1/2007 | Hejlsberg et al. ........... 717/114 |
| 7,237,239 B1 * | 6/2007 | Goel et al. .................. 717/170 |
| 2001/0047407 A1 * | 11/2001 | Moore et al. ................ 709/223 |
| 2002/0032780 A1 * | 3/2002 | Moore et al. ................ 709/228 |
| 2002/0059425 A1 * | 5/2002 | Belfiore et al. .............. 709/226 |
| 2002/0099807 A1 * | 7/2002 | Doyle ......................... 709/223 |
| 2002/0116454 A1 * | 8/2002 | Dyla et al. .................. 709/203 |
| 2002/0124082 A1 * | 9/2002 | San Andres et al. ......... 709/225 |
| 2002/0152226 A1 * | 10/2002 | Burnett ....................... 707/200 |
| 2002/0188591 A1 * | 12/2002 | Santosuosso ................... 707/1 |
| 2003/0028514 A1 * | 2/2003 | Lord et al. ...................... 707/1 |
| 2003/0028695 A1 * | 2/2003 | Burns et al. ................. 710/200 |
| 2003/0033441 A1 * | 2/2003 | Forin et al. ................. 709/315 |
| 2003/0046260 A1 * | 3/2003 | Satyanarayanan et al. ...... 707/1 |
| 2003/0061278 A1 * | 3/2003 | Agarwalla et al. .......... 709/203 |
| 2003/0093575 A1 * | 5/2003 | Upton ........................ 709/310 |
| 2003/0115434 A1 * | 6/2003 | Mahalingam et al. ....... 709/203 |
| 2003/0120867 A1 * | 6/2003 | Cuomo et al. ............... 711/130 |
| 2003/0120875 A1 * | 6/2003 | Bourne et al. ............... 711/144 |
| 2003/0126315 A1 * | 7/2003 | Tan et al. ....................... 710/1 |
| 2003/0145124 A1 * | 7/2003 | Guyan et al. ................ 709/318 |
| 2003/0172196 A1 * | 9/2003 | Hejlsberg et al. ........... 709/328 |
| 2003/0200194 A1 * | 10/2003 | Arnold et al. .................. 707/1 |
| 2003/0225753 A1 * | 12/2003 | Balassanian et al. ........... 707/3 |
| 2004/0002937 A1 * | 1/2004 | Jones et al. .................... 707/1 |
| 2004/0019658 A1 * | 1/2004 | Plastina et al. .............. 709/217 |
| 2004/0078487 A1 * | 4/2004 | Cernohous et al. .......... 709/245 |
| 2004/0098731 A1 * | 5/2004 | Demsey et al. .............. 719/328 |
| 2004/0117358 A1 * | 6/2004 | von Kaenel et al. ............ 707/3 |
| 2004/0128644 A1 * | 7/2004 | Hurst et al. ................. 717/100 |
| 2004/0133573 A1 * | 7/2004 | Miloushev et al. ............. 707/8 |
| 2004/0133607 A1 * | 7/2004 | Miloushev et al. .......... 707/200 |
| 2004/0162930 A1 * | 8/2004 | Forin et al. .................... 711/1 |
| 2004/0225775 A1 * | 11/2004 | Pellegrino et al. ........... 710/200 |
| 2004/0233237 A1 * | 11/2004 | Randow ..................... 345/763 |
| 2005/0027746 A1 * | 2/2005 | Lin et al. .................. 707/104.1 |
| 2005/0160224 A1 * | 7/2005 | Cuomo et al. ............... 711/118 |
| 2005/0165815 A1 * | 7/2005 | Ozzie et al. ................. 707/100 |
| 2005/0171970 A1 * | 8/2005 | Ozzie et al. ................. 707/102 |
| 2005/0222969 A1 * | 10/2005 | Yip et al. ....................... 707/1 |
| 2005/0240943 A1 * | 10/2005 | Smith et al. ................. 719/328 |
| 2006/0080353 A1 * | 4/2006 | Miloushev et al. .......... 707/102 |

OTHER PUBLICATIONS

"Cache Invalidate Filtering with Residence Approximation"—Liu, L IBM-TDB IBM Corp. Jul. 1, 1993 (pp. 221-224).*

"Is data distribution neccessary in OpenMP?"—Nikolopoulos et al.—Supercomputing' 00 ACM/IEEE conference on Supercomputing (CDROM)—Nov. 2000 (pp. 1-14).*

* cited by examiner

| ENTRY | APPLICATIONS | NAMESPACE | INVALIDATION | CACHE CONTROL | GRANULARITY |
|---|---|---|---|---|---|
| 1 | BROWSER, XML, PHONE UI | GLOBAL | EXPIRE AT 03:15 | SERVICE 1 | NONE |
| 2 | VOICE, PHONE UI | USER 1 | ON-DENMAND | SERVICE 2 | NONE |
| 3 | BROWSER | SERVICE 3 | EXPIRE AT 03:01 | CLIENTS | INDIVIDUAL |
| 4 | XML, SERVER APPLICATION 1 (CUSTOM) | SERVICE 4 | ON-DENMAND | SERVICE 4, CLIENT | INDIVIDUAL |
| 5 | BROWSER, XML | USER 2 | EXPIRE AT 03:02 | SERVICE 5 | NONE |

CACHING INFORMATION FOR MULTIPLE SERVICE APPLICATIONS

TECHNICAL FIELD OF THE INVENTION

This invention relates in general to information caching, and more particularly to caching information for multiple service applications.

BACKGROUND OF THE INVENTION

Information caching is important for efficient functioning of network applications. Various applications, such as Web browsers, voice-over-packet communication, and other network applications, use caches to make information available without having to retrieve it again from a database. This saves time and network resources used in repeatedly retrieving information. On the other hand, information that needs to be updated must be kept as current as possible to protect accuracy. Consequently, it is desirable to improve the ability of a caching system to determine how long information should be maintained in the cache and when the information should be reloaded.

SUMMARY OF THE INVENTION

In accordance with the present invention, the disadvantages and problems associated with determining a time to refresh and clear a cache have been substantially reduced or eliminated. In particular, certain embodiments of the present invention provide techniques for organizing a cache into namespaces that may be refreshed and invalidated based on commands from a selected service.

In accordance with one embodiment of the present invention, a method for storing information includes receiving a command for a selected one of a plurality of services, and forwarding the command to a data source corresponding to the selected service. The method also includes receiving data from the data source, and storing the data in a selected namespace in a cache corresponding to the selected service. The method further includes invalidating the data in the namespace according to invalidation criteria provided by the selected service.

In accordance with another embodiment of the present invention, a system includes a service layer supporting multiple services, a cache, and an adapter layer. Each service accesses a corresponding data source in response to receiving a request for data. The cache stores data received in response to the request, and the cache is organized into multiple namespaces, each namespace corresponding to a service supported by the service layer. The adapter layer provides data stored in the cache to clients in response to the request for data Important technical advantages of certain embodiments of the present invention include efficient storage of cached information. Certain embodiments include a cache that stores information in a normalized form that is convertible by adapters into a form usable by various user interfaces and/or application programming interfaces. This allows the cache to store a single copy of the information and provide the information to adapters in response to a request from any application with a suitable adapter. Consequently, the cache uses less space to store information, and once the information is retrieved by one application, it does not need to be retrieved again for subsequent applications so long as the cache entry remains valid.

Other important technical advantages of certain embodiments of the present invention include efficient management of cached information. Certain embodiments allow the service providing cached information to control the invalidation process in the cache. This allows the service to notify the cache of updates by invalidating entries in the cache, so that the cache can maintain the most recent information. Cache entries may also be organized into namespaces, so that entire classes of entries may be invalidated. In one example, a namespace stores all of the cache entries from a particular service. The organization facilitates matching requests for services with particular cache entries, and allows services to conveniently invalidate any or all of the entries. Namespaces may also segregate cache entries by user connection, so that cache entries may be managed separately for each user.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
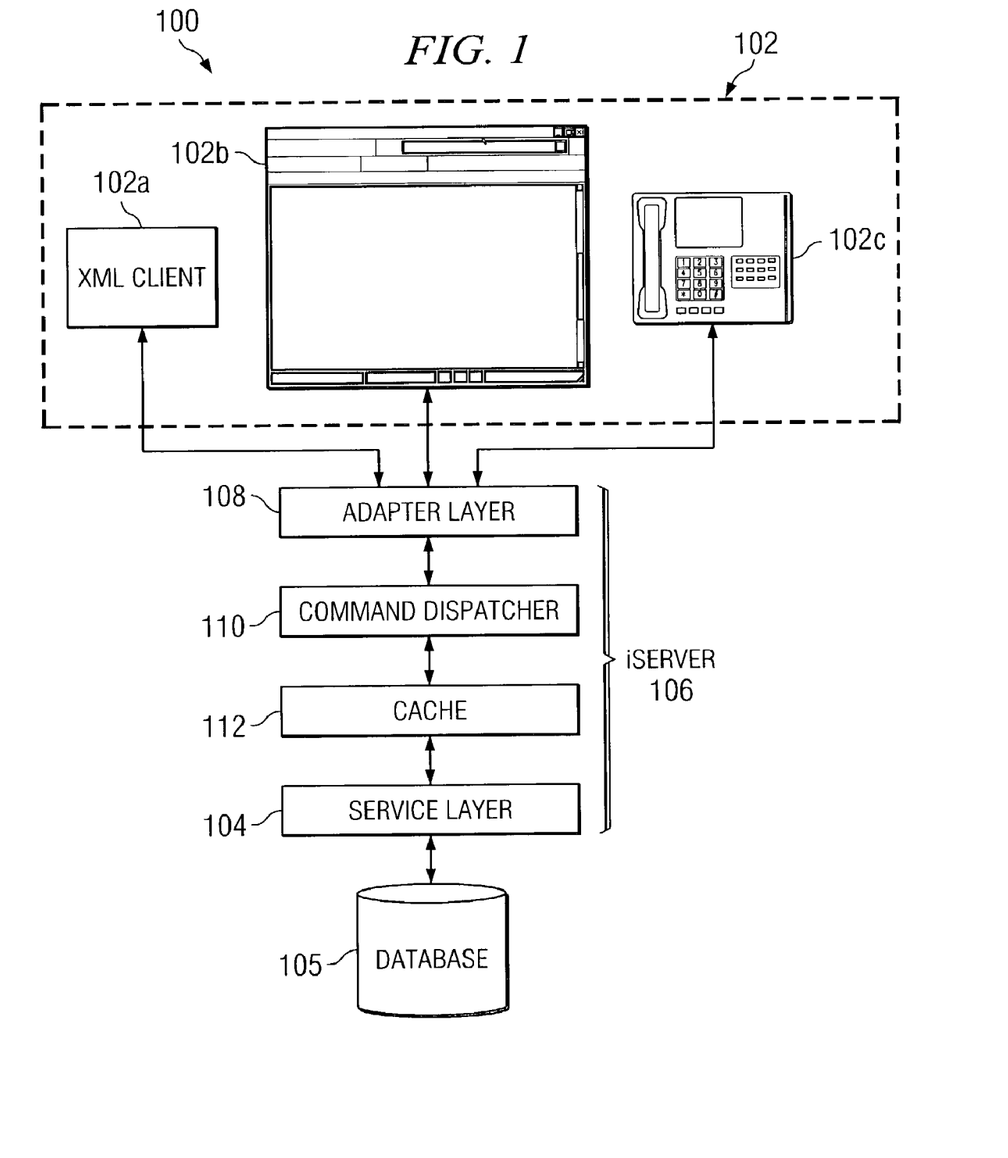
FIG. 1 depicts a system including a cache according to a particular embodiment of the present invention.

FIG. 1 shows a network 100 in which a service layer 104 provides clients 102a, 102b, and 102c (collectively referred to as "clients 102") with information from data sources, which may include external databases 105 as well as applications and memory local to service layer 104. Each client 102 may exchange information with service layer 104 using adapters in an adapter layer 108. For example, an extensible markup language (XML) client 102a may communicate with service layer 104 using an XML adapter that converts information into XML format, while a Web browser 102b might use an HTML adapter. Service layer 104 in turn may generate, retrieve and/or store information in a commonly accessible format, so that multiple clients 102 may access the same piece of information through their respective adapters. For instance, a piece of information retrieved by a database query service might be accessed in XML form by XML client 102a and in HTML form by a Web browser 102b.

Clients 102 represent any combination of hardware and/or software that executes applications using information provided by service layer 104 from database 105. Clients 102 may perform any suitable information processing using any form of information and any suitable communication protocol, including HTTP, XML, HTML, JavaScript, H.323, Internet protocol (IP), asynchronous transfer mode (ATM), direct socket, or any other suitable method of information exchange. Information may include voice, video, data, or any other suitable media, and may be communicated as packets, cells, frames, or other segments or portions of information (collectively referred to as "packets"). Clients 102 may include any suitable form of user interface allowing a user to view, hear, or otherwise receive output of information, and/or any application that views, manipulates, or otherwise controls the information.

Clients 102 may exchange information with other components of network 100 using an interface server 106. Server 106 represents any hardware and/or software that provides multi-format and multi-transport of information to and from clients 102. Although described as a server, server 106 may also refer to any hub, switch, router, gateway, or other suitable network component that exchanges information with clients 102. In a particular embodiment, server 106 includes an adapter layer 108, a command dispatcher 110, a cache 112, and a service layer 104. Adapter layer 108 converts the format, protocol, or other characteristics of information to allow client 102 to exchange information with other components of network 100. For example, adapter layer 108 may convert information from clients 102 into a normalized format or protocol to facilitate handling of information through network 100. Command dispatcher 110 in turn sends and receives commands relating to objects in the normalized format. For example, command dispatcher 110 may receive from clients 102 a command requesting information from a service. Command dispatcher 110 may process the command by retrieving information from cache 112 or forwarding it to service layer 104. Command dispatcher 110 may also receive events generated by service layer 104 for clients 102. An "event" refers generally to any notification provided by service layer 104 to client 102, either generated spontaneously by service layer 104 or requested by client 102. Command dispatcher 110 receives the event from service layer 102, identifies a client to which the event is directed, and communicates it to a corresponding adapter in adapter layer 108.

In particular embodiments, server 106 may perform a wide array of functions useful for establishing a framework for multi-application, multi-platform operations, including any of the following examples. Server 106 may define and host application commands and events that are independent of the connection model and transport protocols that connect server 106 to clients 102. Server 106 may also describe and register commands and partition commands into separate domains, known as "namespaces." For example, server 106 may group several applications into a namespace, and register a set of normalized commands, each of which is convertible to a corresponding command for any of the applications in the namespace. Server 106 may provide transport adapters and application-independent connections to facilitate information transport to and from multiple applications, and may also maintain state information and provide other functionality that may be shared by multiple applications.

Cache 112 represents any device or memory for storing information retrievable by clients 102. Cache 112 may include any suitable storage media, including magnetic media, optical media, removable media, local storage, remote storage, CD-ROMs, DVD-ROMs, or any other suitable form of information storage. When clients 102 request information that is available in cache 112, cache 112 may provide the information to clients 112 without receiving updated information from service layer 104. Cache 112, therefore, provides more efficient retrieval of information when updating the information stored in cache 112 is unnecessary. Cache 112 maintains entries until they are invalidated or updated by clients 102 or service layer 104 or until the entry has aged beyond an expiration time, which may be set at the time of initial storage but may also be adjusted by an application that has control over cache 112. In a particular embodiment, command dispatcher 110 manages cache 112, so that command dispatcher 110 makes all relevant determinations as to whether cache entries are valid, whether a requesting device can access an entry, and whether a particular component is permitted to invalidate entries or otherwise control cache 112.

Cache 112 may also organize cached information into namespaces, which may correspond to the command namespaces described above. For example, if the commands for several application are grouped into a single namespace, then information usable by all of those applications may be grouped into a single namespace in cache 112. Each namespace may specify a range of accessibility for information stored in the namespace. For instance, a namespace may restrict access to a connection with a particular client 102 or may make the cached information available globally. The namespace may also specify components of network 100 that have permission to control the caching of information within that namespace. As one example, the namespace may allow particular applications in service layer 104 to control data in the namespace. Thus, clients 102 and other applications in service layer 104 would not have permission to invalidate or update entries in cache 112.

In certain cases, the same piece of information may be usable by several different clients 102. In such cases, cache 112 may store the information in a namespace accessible by clients 102 that may use it. Cache 112 maintains the information in a normalized form or protocol that may be converted by server 106 to a form suitable to the particular client 102 retrieving the information. Thus, cache 112 only needs to maintain a single copy of the information to make the information accessible to multiple applications.

Service layer 104 represents any hardware and/or software that exchanges information with user devices 102 in order to provide services to user devices 102. Services may include any suitable form of information processing or retrieval application, including database querying, email, computer telephony interface, or other suitable applications. Services may also include access to network resources, including connections to additional application servers, databases, communication devices, sensors, hubs, switches, routers, gateways, or any other network resource. In the course of exchanging information with clients 102, service layer 104 may retrieve information from database 105. Database 105 represents any form of information storage, whether volatile or non-volatile, and may include magnetic media, optical media, removable media, local storage, remote storage, CD-ROMs, DVD-ROMs, or any other suitable form of information storage accessible by service layer 104.

In operation, clients 102 exchange information with service layer 104, including information retrieved from database 105. Once information is retrieved from database 105, cache 112 stores the information so that subsequent requests for the same information will return cached information rather than retrieving updated information from database 105. Cached information may be maintained until invalidated either by a command from clients 102 or service layer 104 or by passing an expiration time for the information.

Figure 2:
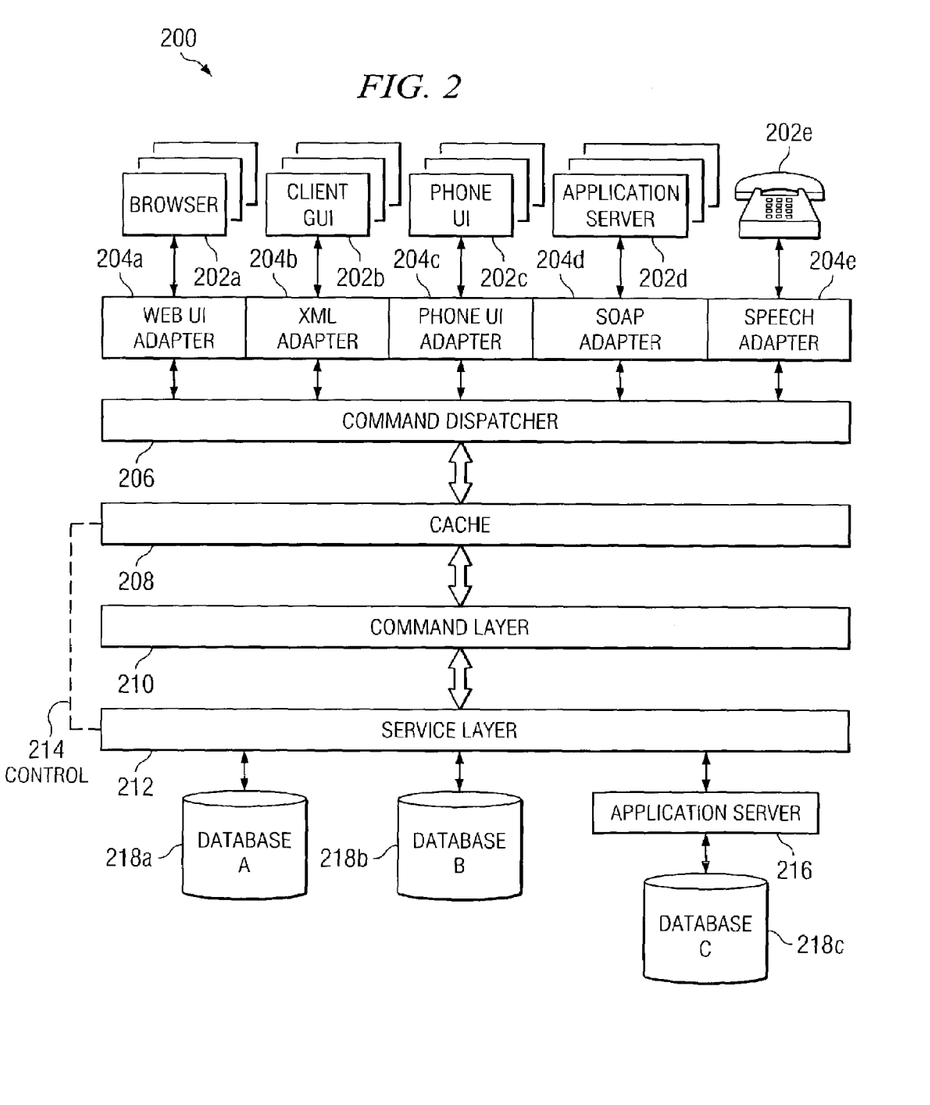
FIG. 2 is a layer diagram of the system of FIG. 1.

FIG. 2 shows a particular embodiment of a network 200 schematically depicted in a layer diagram. User interface layer 202 represents clients 202a, 202b, 202c, 202d, and 202e (collectively referred to as "clients" 202) that provide information to users or applications using appropriate user interfaces. In the depicted embodiment, user interface layer 202 includes Web browsers 202a, client graphical user interfaces (GUIs) 202b, phone UIs 202c (such as voice communication software running on a PC), application servers 202d, and telephones 202e. User interface layer 202 exchanges information with other components of network 200 through adapter layer 204.

Adapter layer 204 normalizes commands and other forms of information received from user interface layer 202 for transport to service layer 212, and also converts events and other information received from command dispatcher 206 into a suitable form for particular client applications in user interface layer 202. Each type of client 202 in user interface layer may use a separate adapter in adapter layer 204. In the depicted embodiment, adapter layer 204 includes a Web UI adapter 204a for Web browsers 202a, an XML adapter 204b for client GUIs 202b running XML code, a phone UI adapter 204c, a socket application (SoAp) adapter 204d for specific applications on application server 202d, and a speech adapter 204e that converts encoded voice information into voice output signals for phones 204e.

Command dispatcher 206 exchanges commands with adapter layer 204 and other components of network 200. Command dispatcher 206 receives a command in a normalized form from adapter layer 204 and processes the command, which may involve forwarding the command to a service of service layer 212 or retrieving information from cache 208. Command dispatcher 206 also receives normalized responses from service layer 212 and cache 208 and routes the commands to clients 202 using corresponding adapters of adapter layer 204. Particular embodiments of command dispatcher 206 may register and organize commands into namespaces. For example, a normalized information retrieval function, such as "get," could be put into a namespace, and the command will be converted by adapter layer 202 into a form suitable for the particular user interface layer application. Thus, Web UI adapter 204a converts an HTTP GET command from Web browser 202a into a normalized "get" command.

Cache 208 stores information, and whenever valid cached information is available, cache 208 provides information to user interface layer applications in response to information retrieval requests from those applications. Cache 208 may organize information into namespaces 222, so that information usable by multiple applications may be maintained as a single piece of information. For example, suppose that the piece of information is a table of numbers, and this information may be output as a table by Web browser 202a, a graph by client GUI 202b, and a spreadsheet by application server 202d. Rather than storing rendered versions of the table, graph, and spreadsheet, cache 208 may store a normalized form of the information in a namespace 222 accessible by Web browser 202a, client GUI 202b, and application server 202d. Cache 208 provides the normalized form of the information in response to a normalized retrieve request from any of the permitted applications, and command dispatcher 206 then communicates the information to the appropriate application using the corresponding adapter in adapter layer 204.

Cache 208 maintains criteria for determining when to invalidate data as well. One technique is to invalidate entries after the entry has aged past an expiration time set at the time of caching. But cache 208 may also provide increased flexibility in expiration time, so that the expiration time may be set by other components of network 200, such as service layer 212, and so that the expiration time may be updated by various applications at some time after initial storage. In principle, cache 208 may invalidate a cache entry based on any suitable criteria, including expiration of time, receiving commands to invalidate one or more entries in a particular namespace 222, detecting that the corresponding piece of information has been updated in a database 218, identifying a "no-cache" command within the information, or otherwise determining that the stored information needs to be updated. Cache management 220 represents any component of cache 208 that performs information management tasks such as those described above. In addition to performing management tasks autonomously, cache management 220 may be controlled by external components.

Command layer 210 interfaces with service layer 212 to convert commands from a generalized form into a form recognizable by particular services. Command layer 210 thus functions much like adapter layer 204, but for services rather than clients 202. Command layer 210 responds to commands received from command dispatcher 206 as well as events received from service layer 212.

Service layer 212 represents shared hardware and/or software resources that provide services to user interface layer 202. Service layer 212 may execute various applications as well as providing access to other components, such as application server 216 and databases 218a, 218b, and 218c, collectively referred to as "databases 218." Service layer 212 may organize information into namespaces as well. Namespaces may be organized by particular service, such that information associated with a particular service or usable to particular user layer interfaces may be organized into a single namespace. These namespaces are shared with other layers, thus establishing a normalized form for handling commands and information exchanged among layers in layer diagram 200. Service layer 214 maintains a control connection 214 to cache 208. Control connection 214 allows service layer 212 to issue commands to manage the way in which information is cached. For example, service layer 212 can specify an expiration time for information in a particular database, restrict access to the information, permit user interfaces to specify the caching parameters, invalidate entries as updated information becomes available, or initiate any other relevant caching function.

In operation, a particular device in user interface layer 202 generates a request for information. Adapter layer 204 converts the request to a normalized form and communicates the request to command dispatcher 206. Command dispatcher 206 identifies the requested service and determines whether cache 208 contains a valid cache entry that corresponds to the requested information, such as whether there is a namespace corresponding to the requested service. If a namespace is associated with the requested service, command dispatcher 206 determines whether there is a valid entry corresponding to the requested information. Finally, if a valid entry is available, command dispatcher 206 may retrieve the cached information from cache 208. Command dispatcher 206 communicates the information to the appropriate adapter of adapter layer 204, which converts the information to a form usable by an interface of user interface layer 202.

If there is no valid cache entry, command dispatcher 206 communicates the information request to command layer 210, which identifies the service associates with the request and communicates the request to that particular service in service layer 212. In response to the request, service layer 212 retrieves or generates information, either locally or from a remote source such as application server 216 or databases 218. Service layer 212 returns the information to command layer 210 along with any control messages to regulate caching of the information. The control message instructs cache 208 on the proper manner of caching the information returned by service layer 212, which may include setting an expiration time, specifying a form for caching the information, instructing cache 208 to maintain the information until a subsequent instruction is received or not to cache the information at all, restricting access by user interface layer 202 devices, assigning a namespace to the information, or providing any other suitable caching command. Cache 208 receives the information, and command dispatcher 206 caches the information according to any instructions from the service layer 212. Command dispatcher 206 then presents the information to user interface layer 202 as described above.

Once the information is cached, cache 208 maintains the information until it is invalidated by expiration, specified events, or other criteria being met. In the case of information that is usable by multiple user layer interfaces, cache 208 may maintain the information in a normalized form in a namespace accessible by each of the specified user layer interfaces. When a request for the information is received, cache 208 submits the information to command dispatcher 206 in normalized form, and command dispatcher 206 communicates the information to user interface layer 202 via adapter layer 204.

Figure 3:
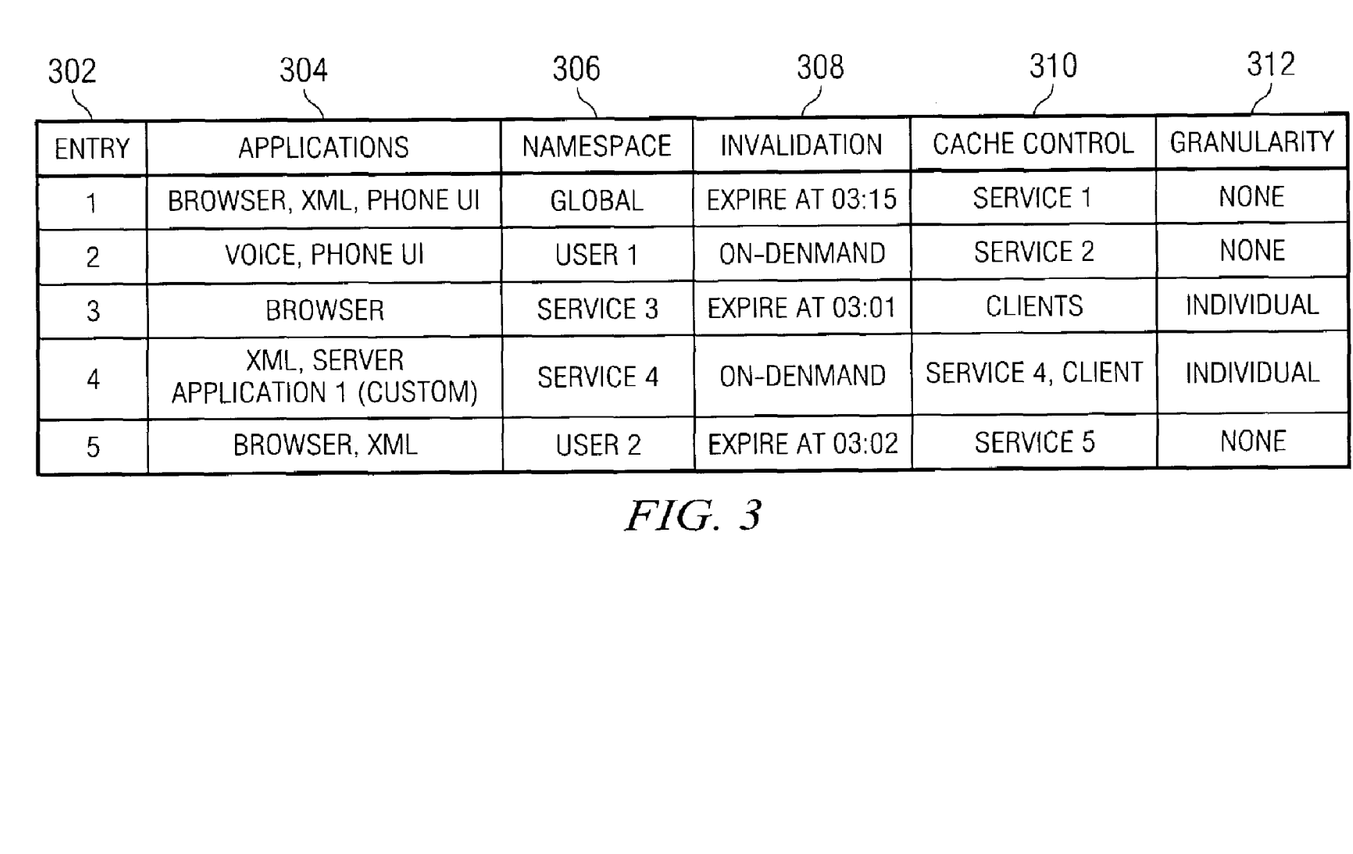
FIG. 3 is a table organizing cached information into namespaces.

FIG. 3 shows one example of a table 300 that cache may use to organize information into namespaces and maintain invalidation criteria for cache entries. Entry 302 lists identifiers for each cache entry, corresponding to a particular piece of information. Application 304 indicates applications which can access and use the particular cache entry. Thus, when an application makes a particular service request, cache 208 may determine whether the information stored is usable by that application. In a particular embodiment, cache 208 stores information in a normalized form, so that cache entries are accessible by multiple clients 202.

Namespace 306 indicates a particular namespace in which each cache entry is stored. In the depicted embodiment, there are three types of namespaces. The first type of namespace is the global namespace. Global namespaces are accessible by any application, and may store information from any service. A second type of namespace is a user namespace. Entries cached in a user namespace may be maintained separately for a particular user connection, so that entries may be updated at different times or otherwise cached differently for different users Service namespaces separate cache entries by service. Separating entries by service allows efficient invalidation of cache entries by allowing an entire group of cache entries to be invalidated as a particular service updates information. For example, suppose that a service provides weather information for many cities, updated every 15 minutes. Each cache entry might correspond to several weather facts about each city (e.g., temperature, humidity, windspeed, and precipitation), and applications could request weather information for each city separately. After any application requests the information for a particular city, that information is cached. Different application might display the information differently, so an IP phone might display the information in a ticker on a display screen, while a PC might display the information in graphical form with clouds, thermometers, and similar symbols. Cache 208 maintains cache entries in a normalized form, so that each different type of display can use the same cache entry. The service providing the weather information then indicates that updated information is available by invalidating the entries in the associated service namespace. For example, the service providing weather information may receive updated information from a national weather organization every hour, and the service would then invalidate the entire namespace every hour.

Invalidation criteria 308 specifies the criteria for the particular entry to be invalidated. In the depicted embodiment, the two criteria are "Expire at <time>," indicating that the cache entry should be invalidated at a particular time, and "On demand," indicating that the cache entry should be invalidated when a command is received from an entity authorized to control the cache. The particular invalidation criteria selected are only examples, and in particular embodiments, different criteria or other combinations of criteria may be used. For example, cache 208 may set an entry to expire at a particular time, but also allow the entry to be invalidated earlier on demand. Cache control 310 lists entities authorized to control the cache. For example, a particular entry may be controlled by the service providing the entry, by a user layer interface, or by any other suitable entity. Granularity 312 specifies whether each entry within a namespace is controllable separately, or whether the entire namespace is treated as a whole for purposes of invalidation. A granular entry may be invalidated separately, as in the case where weather information for each city is updated as information for that city is updated. A non-granular entry is invalidated along with the entire namespace, as in the case where weather information for all cities is invalidated.

Figures 4, 5:
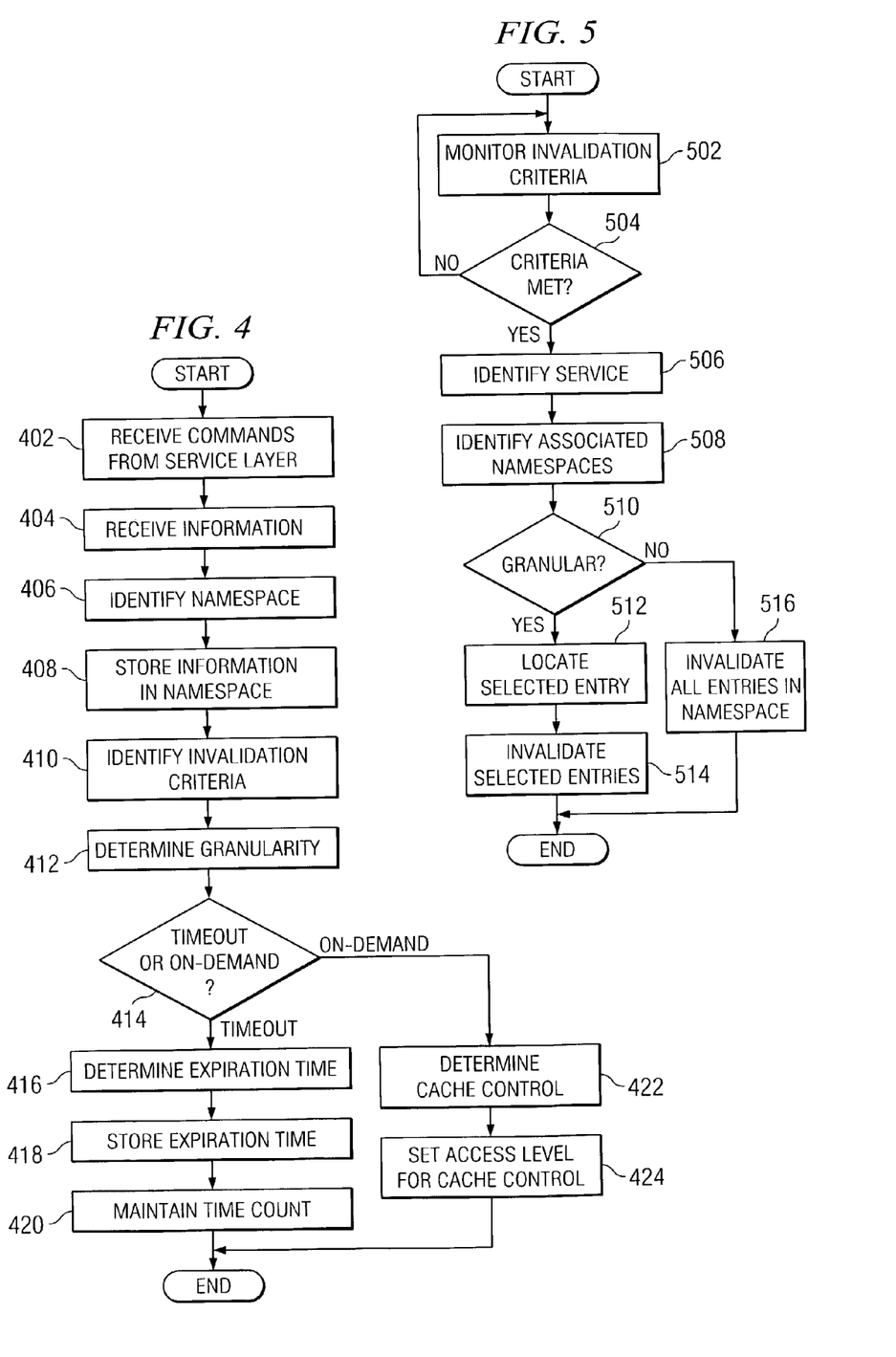
FIG. 4 is a flowchart showing a method for caching information.
FIG. 5 is a flowchart showing a method for invalidating cache entries.

FIG. 4 is a flowchart showing one example of a method for caching information that is not already validly stored in cache 208. Cache 208 receives commands regarding the cache properties of information to be received at step 402. This allows cache 208 to determine the proper handling of information. If service layer 212 does not provide any caching instructions, cache 208 may default to a particular caching scheme, such as caching in the global namespace with a default expiration time and user layer control of the entry.

Cache 208 receives the information to be cached at step 404. Cache 208 identifies a namespace in which to store the information at step 406, based either on the instructions received from service layer 212 or according to a default assignment. Cache 208 stores the information in the selected namespace at step 408.

Next, cache 208 determines the criteria that will be used to invalidate the entry at step 410, again either by instructions received from service layer 212 or by default. Cache 208 also determines a granularity for the invalidation criteria at step 412. The granularity determines whether the invalidation criteria will apply to the entire namespace in which the cache entry is stored, or whether it will apply only to the particular entry. In steps 414 through 424, cache 208 sets the particular properties for invalidation of the entry. Cache 208 first determines whether the invalidation criteria represent a timeout test, such that the entry expires at a specified time, or an on-demand test, such that an entry is invalidated in response to a command received by cache 208 at step 414. In the case of a timeout test, cache 208 determines an expiration time at step 416 and stores the expiration time at step 418. Cache 208 then monitors a system time at step 420 so that the entry may be invalidated at the appropriate time. If the test is an on-demand test, cache 208 determines what entities will have control of cache 208 at step 422 so that cache 208 will only accept an invalidation command for the entry from those entities. Cache 208 then sets an access level for the entry or namespace at step 424. The access level allows only the selected entities to access the entry.

FIG. 5 is a flowchart showing one example of a method for cache invalidation after the invalidation criteria are set. Cache 208 monitors invalidation criteria at step 502. At step 504, cache 208 determines if the invalidation criteria have been met. If the criteria have been met, then cache proceeds to invalidate the entry, as described in steps 506 through 516.

Cache 208 first identifies the associated service in order to identify the cache entry or entries to be invalidated at step 506. Cache 208 then determines a namespace for the entry based on the identified service at step 508. For example, if entries are separated into service namespaces, cache 208 may identify the namespace associated with the service. Cache 208 determines if the namespace is granular at step 510. If the namespace is granular, cache 208 locates the cache entry to be invalidated at step 512 and invalidates the entry at step 514. If the namespace is non-granular, cache 208 invalidates all the entries in the namespace at step 516.

Figure 6:
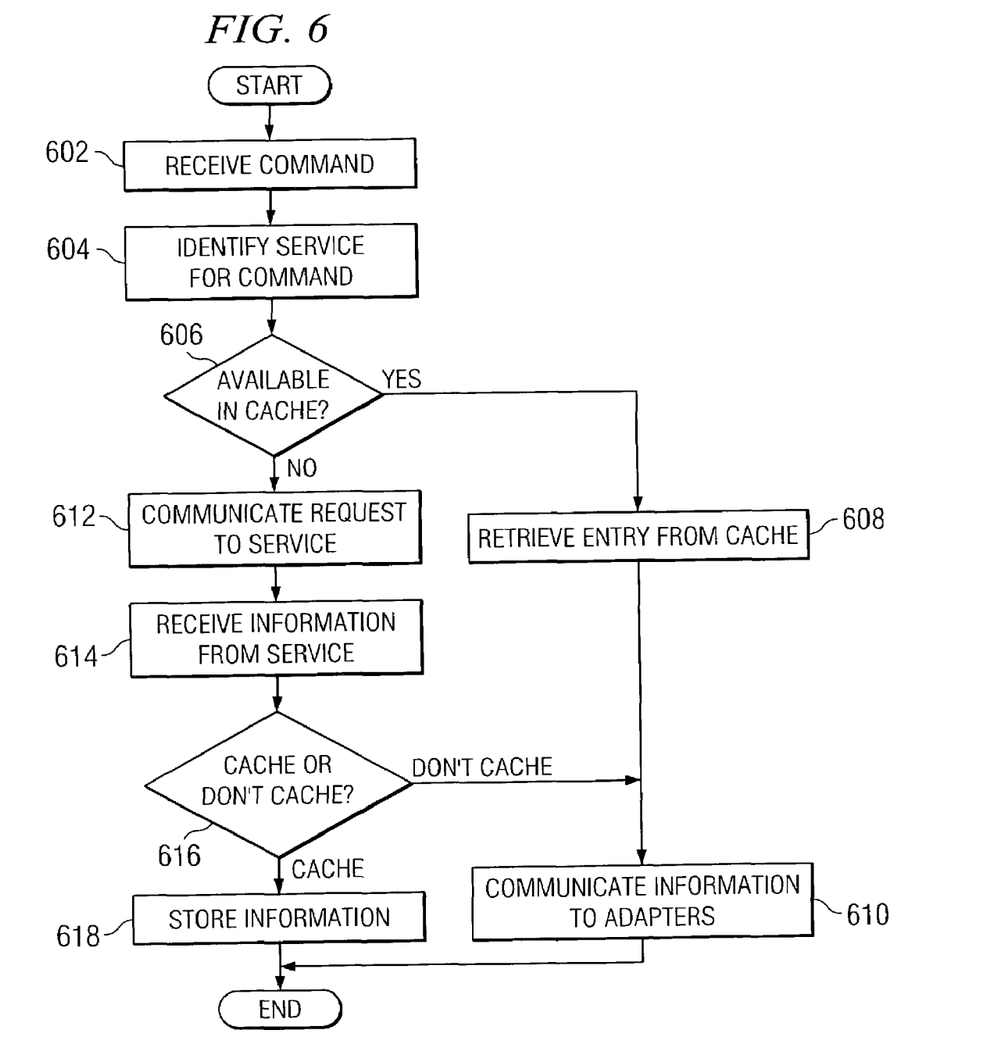
FIG. 6 is a flowchart showing a method for handling a request for information in the system of FIG. 1.

FIG. 6 is a flowchart showing a method for the command dispatcher 206 to process commands received from user interfaces of user interface layer 202. Command dispatcher 206 receives a command from user interface layer 202 at step 602. Command dispatcher 206 identifies a service requested by the command at step 604. At step 606, command dispatcher 206 determines whether the information requested by the command is available in cache 208.

If the information requested by the command is available in cache 208, command dispatcher 206 retrieves the entry from cache 208 at step 608 and communicates the information to an appropriate adapter of adapter layer 204 at step 610, which in turn provides the information in usable form to the requesting user interface. If the information requested by the user interface is not available in cache 208, command dispatcher 206 communicates the request for information to the appropriate service of service layer 212. Command dispatcher 206 receives the information response from the service at step 614, and determines whether to cache the information or not at step 616. If the information is to be cached 208, command dispatcher 206 allows cache 208 to cache the information at step 618 and communicates the information to adapter layer 204 at step 610.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A computer-implemented method for caching information for multiple service applications, comprising:
   receiving a command for a selected one of a plurality of services, wherein receiving a command comprises receiving a command from a client at one of a plurality of adapters, each adapter operable to communicate using a designated communication protocol;
   forwarding the command to a data source corresponding to the selected service;
   receiving data from the data source;
   storing the data in a selected one of a plurality of namespaces in a cache, the selected namespace corresponding to the selected service, wherein determining that data responsive to the command is not stored in the cache; invalidating the data in the selected namespace according to invalidation criteria provided by the selected service;
   receiving a second command for the selected service in the cache from a second client at a second adapter;
   determining that data responsive to the second command is stored in the selected namespace in the cache;
   retrieving the data from the cache; and
   providing the data to the second adapter.

2. The method of claim 1, wherein invalidating comprises invalidating all entries in the namespace.

3. The method of claim 1, further comprising:
   providing the data to a first adapter operable to convert the data into a form usable by a first user interface; and
   providing the data to a second adapter operable to convert the data into a form usable by a second user interface.

4. The method of claim 1, further comprising determining whether the namespace has a granularity, wherein invalidating the data in the namespace comprises invalidating the data according to the granularity of the namespace.

5. The method of claim 4, wherein invalidating the data in the namespace comprises invalidating a selected entry of data in the namespace if the namespace is granular.

6. The method of claim 4, wherein invalidating the data in the namespace comprises invalidating all entries in the namespace if the namespace is non-granular.

7. The method of claim 1, further comprising:
   determining whether the invalidation criteria comprises an on-demand test;
   receiving an invalidation command if the invalidation criteria comprises the on-demand test; and
   invalidating the data in the namespace according to the invalidation command.

8. A computer-implemented method for caching information for multiple service applications, comprising:
   receiving a first command from a client at one of a plurality of adapters, each adapter operable to communicate with a corresponding client using a designated communication protocol, the first command comprising a request for data;
   forwarding the first command to a data source;
   receiving data from the data source;
   storing the data in a selected one of a plurality of namespaces in a cache in a normalized form and the selected namespace corresponds to a selected service, wherein each adapter is operable to convert the normalized form into the respective designated communication protocol for the adapter and the data in the selected namespace is invalidated according to invalidation criteria provided by the selected service;
   providing the stored data in the selected namespace in the cache to one of the adapters in response to a second command from any of the clients requesting the data;
   receiving a third command from one of the clients;
   providing the data to a second adapter in response to the third command from a second client;
   determining that the data is no longer a valid cache entry; and
   forwarding the third command to the data source.

9. The method of claim 8, further comprising:
   receiving invalidation criteria from the data source providing the data; and
   invalidating the stored data according to the invalidation criteria.

10. The method of claim 8, wherein the data is stored in a selected one of a plurality of namespaces, each namespace corresponding to one of the data source.

11. The method of claim 8, wherein the data is stored in a selected one of a plurality of namespaces, each namespace corresponding to one of the clients.

12. A server for caching information for multiple service applications, comprising:
   a processor for processing data;
   a service layer supporting a plurality of services, each service operable to access a corresponding data source in response to receiving a request for data;
   a cache operable to store data received in response to the request, the cache organized into a plurality of namespaces, each namespace corresponding to a service supported by the service layer, the cache operable to invalidate the data according to invalidation criteria provided by a service selected from the plurality of services;

an adapter layer comprising a plurality of adapters, the adapter layer operable to provide data stored in the cache to one of a plurality of clients in response to the request for data; and a command dispatcher operable to:

receive requests for data for a selected service from the adapter layer;

determine whether the requested data is available in the namespace corresponding to the selected service in the cache;

communicate the request to the selected service of the service layer; and retrieve the data from the selected namespace in the cache if the data is available in the cache;

receive the retrieved data intended for a selected client;

determine that one of the adapters corresponds to the selected client; and provide the retrieved data to the corresponding adapter.

13. The server of claim 12, wherein the service layer is operable to provide the invalidation criteria for the data stored in the cache.

14. The server of claim 12, wherein:

each adapter communicates information using a different communication protocol; and the data is stored in the cache in a normalized form, wherein each adapter is operable to convert the data in the normalized form into the communication protocol of the adapter.

15. A computer readable storage medium embodying software for caching information for multiple service applications, the software when executed operable to perform the steps of:

receiving a command for a selected one of a plurality of services, wherein receiving a command comprises receiving a command from a client at one of a plurality of adapters, each adapter operable to communicate using a designated communication protocol;

forwarding the command to a data source corresponding to the selected service;

receiving data from the data source;

storing the data in a selected one of a plurality of namespaces in a cache, the selected namespace corresponding to the selected service, wherein the data in the selected namespace is invalidated according to invalidation criteria provided by the selected service;

receiving an additional command for the selected service;

determining the selected service corresponds to the data in the selected namespace in the cache;

determining that the data is valid; and providing the data to an adapter operable to convert the data into a form usable by a user interface.

16. The computer readable storage medium of claim 15, further operable to perform the steps of:

providing the data to a first adapter operable to convert the data into a form usable by a first user interface; and providing the data to a second adapter operable to convert the data into a form usable by a second user interface.

17. A server including a cache for caching information for multiple service applications, comprising means for exchanging information with one or more clients, wherein the means for exchanging comprises:

a processor for processing data;

means for receiving a command for a selected one of a plurality of services;

means for forwarding the command to a data source corresponding to the selected service;

means for receiving data from the data source;

means for storing the data in a selected one of a plurality of namespaces in a cache, the selected namespace corresponding to the selected service, wherein the data in the selected namespace is invalidated according to invalidation criteria provided by the selected service;

means for receiving an additional command for the selected service;

means for determining the selected service corresponds to the data in the selected namespace in the cache;

means for determining that the data is valid; and means for providing the data to an adapter operable to convert the data into a form usable by a user interface.

* * * * *